Patented June 30, 1942

2,288,405

UNITED STATES PATENT OFFICE 2,288,405

RECOVERY OF ZINC VALUES

Raymond J. Kepfer, Lakewood, Ohio, assignor to E. I. du Pont de Nemours & Company, Wilmington, Del., a corporation of Delaware No Drawing. Application February 3, 1940, Serial No. 317,131

3 Claims. (Cl. 23—97)

This invention relates to methods for recovering values from galvanizer's sal ammoniac skimmings, and is particularly directed to processes whereby residues substantially free of ammonium compounds and solutions containing zinc chloride-ammonium chloride double salts suitable for use as galvanizing fluxes are simultaneously produced by treating sal skimmings with suitable proportions of dilute ammonium hydroxide.

A galvanizing flux containing ammonium chloride loses its fluxing ability after a period of use on a galvanizing pot and must be skimmed off and replaced. The skimmings, which are known to the art by such terms as "galvanizer's waste," "sal skimmings" and "spent flux" always contain, along with other constituents, zinc metal, iron compounds, and zinc and ammonia associated with chlorine as various chlorides, oxychlorides, or double salts. The ammonia and combined zinc constituents may conveniently be represented as their single chlorides, but such representation does not mean that the amounts of single salts shown are actually present as such.

Recovery of zinc chloride, ammonium chloride and metallic zinc values from sal skimmings has been the objective of numerous processes heretofore proposed. In one process, the skimmings are milled with hot water, metallic zinc and dross are screened off, and the zinc chloride liquor thus obtained is used for purposes where the presence of substantial amounts of ammonium chloride is not a detriment. However, if this liquor is evaporated to dryness, the ammonium chloride content of the salts so obtained is not sufficiently high to permit their economical use as galvanizing fluxes, since for maximum life and fluxing action a galvanizing flux preferably should contain about three molecules of ammonium chloride for each molecule of zinc chloride and the salts obtained by this method will ordinarily have less than the desired ratio.

It has been suggested to build up the ammonium chloride content of a purified extraction liquor such as above described by adding ammonium chloride so that a suitable galvanizing flux can be crystallized from the liquor. This procedure is not only expensive, but the amounts of ammonium chloride which must be added increase in direct proportion to the amount of zinc chloride in the process. A continuous increase in the amount of zinc chloride-ammonium chloride double salts which must be produced thus results, since no provision is made for separation of the zinc chloride constituent.

It has also been proposed to build up the ammonium chloride content of such leach liquors as above described and then to add ammonium hydroxide in such concentrations that the so-called "ammoniated zinc chlorides" or "zinc amminochlorides" may be crystallized out of the resultant liquor. A "diammoniated zinc chloride, $ZnCl_2 \cdot 2NH_3$," or a "zinc amminochloride, $Zn(NH_3)_4Cl_2$," may thus be obtained. Neither of these compounds as such are satisfactory galvanizing fluxes. When either is added to a galvanizing pot at working temperature a portion of its ammonia content is volatilized and it is converted into "mono-ammoniated zinc chloride, $ZnCl_2 \cdot NH_3$" which is a more satisfactory flux. However, the ammonia which is volatilized during this conversion is almost entirely lost; hence, diammoniated zinc chloride cannot be considered to be an economical galvanizing flux.

Processes for recovering values from sal skimmings which involve preparation of ammoniated zinc chlorides further suffer from the disadvantage that all the soluble zinc values are recovered in association with substantial amounts of ammonia or ammonium chloride. As already pointed out, in such processes it is necessary that ammonia or ammonium chloride be added in direct proportion to the zinc chloride in the sal skimmings, since no provision is made for recovering the zinc chloride in relatively pure form. The building up of the amount of zinc chloride-ammonium chloride double salt or ammoniated zinc chloride which must be produced causes the entire process at times to become economically unbalanced. Conversely, processes which permit isolation of the zinc chloride in relatively pure form are economically balanced at all times since there is a wide variety of uses for zinc chloride uncontaminated with substantial amounts of ammonium chloride.

Now I have found that by extracting sal skimmings with suitable proportions of dilute ammonium hydroxide and filtering off the insoluble residues, a liquor can be made from which can be crystallized double salts of zinc chloride and ammonium chloride suitable for use as galvanizing fluxes. Metallic zinc can be recovered by screening or sedimentation, either before or after filtering off the insoluble residues, and after filtration the balance of the residues can be converted to zinc chloride merely by dissolution in hydrochloric acid. The zinc chloride so obtained has an ammonium chloride content well below the maximum limit permissible for most uses.

By the application of the processes of my invention to the recovery of values from galvanizer's sal ammoniac skimmings, all the valuable constituents of the sal skimmings can be recovered in commercially salable form. The ammonium chloride is recovered as zinc chloride-ammonium chloride double salt having a zinc chloride-ammonium chloride ratio which is best adapted to the needs of a galvanizing flux. The ammonium hydroxide added is converted to ammonium chloride and this is also recovered as a double salt with zinc chloride. The portion of zinc chloride constituents not used in making the double salt is recovered as zinc chloride of salable quality. Metallic zinc is recovered directly, in accordance with considerations previously known. It is therefore evident that none of the constituents of the sal skimmings is wasted, but all are recovered in a form for which there is an established demand.

In the operation of my novel processes for treating sal skimmings the concentrations of ammonium chloride and ammonium hydroxide are maintained low enough to prevent the formation of ammoniated zinc chloride. The ammonium hydroxide is permitted to be only strong enough to precipitate as a basic zinc chloride a predetermined portion of the soluble zinc values present in the sal skimmings. The manner of determining the proportion of soluble zinc values to be so precipitated will be fully set forth in the following description of my invention.

The nature of my novel processes for recovering values from sal skimmings and their manner of application may be better understood from the following illustrative examples.

*Example 1*

The purpose in this example was to prepare from galvanizer's sal skimmings a galvanizing flux having zinc, ammonia, and chlorine present in the ratios indicated by the empirical formula $ZnCl_2 \cdot 3NH_4Cl$ and the proportions of materials used were governed accordingly.

The sal skimmings used had a total water soluble zinc content equivalent to 32.2 per cent $ZnCl_2$ and a total ammonia content equivalent to 10.9 per cent $NH_4Cl$. Thus, water soluble zinc chloride and ammonium chloride were present in the proportions necessary to form the empirical compound $ZnCl_2 \cdot 0.86NH_4Cl$.

An extraction solution was made by dissolving 18.9 parts by weight of aqueous ammonia containing 28.7 per cent $NH_3$ in 837 parts by weight of a liquor containing 12 parts of zinc ammonium chloride having approximately the empirical formula $ZnCl_2 \cdot 3NH_4Cl$, the amount of ammonia added being calculated to be sufficient, after the extraction step, to precipitate basic zinc chloride. This liquor, before the addition of the ammonia, was representative of the wash liquor obtained by washing a filter press cake produced according to the processes of this example, as will be described below.

To this basic extraction solution there was added 181.5 parts by weight of the sal skimmings. The mixture was agitated mechanically for thirty minutes at 120° F. The insoluble material, containing basic zinc chloride, metallic zinc, and other insolubles was then filtered off, and the press cake was washed with water, the wash water being kept separate from the filtrate.

There was obtained 674 parts by weight of filtrate which upon analysis was found to contain 9.3 per cent of total salts. Of this total salt content 46.4 per cent was total zinc calculated as zinc chloride ($ZnCl_2$) and 53.6 per cent was total ammonia calculated as ammonium chloride ($NH_4Cl$), the molecular proportion being very close to $ZnCl_2 \cdot 3NH_4Cl$. The extraction liquor was slightly basic to methyl orange, and was accordingly neutralized with hydrochloric acid to the methyl orange end-point before crystallization.

By evaporation and crystallization of this extraction liquor a product was obtained which had an average composition represented by the empirical formula $ZnCl_2 \cdot 3NH_4Cl$.

The ammonium chloride content of the washed filter cake obtained as above described was determined to be .13 per cent which corresponds to about .26 per cent on the basis of the dried cake. After mechanical removal of the metallic zinc from this press cake, the remainder of the insoluble material was converted to zinc chloride by dissolving in muriatic acid. The zinc chloride so obtained had an ammonium chloride content well below the maximum permissible in commercial grades of zinc chloride for most purposes.

When sal skimmings are extracted with dilute ammonium hydroxide in accordance with a process of my invention, the amount of ammonium hydroxide used is so related to the zinc chloride content of the sal skimmings that a basic zinc chloride is precipitated. By controlling the amount of basic zinc chloride formed, the ratio of zinc chloride to ammonium chloride in the extraction liquor may be controlled. I have found that the proportion of dilute ammonium hydroxide required to produce a given zinc chloride-ammonium chloride ratio from a given lot of sal skimmings is dependent upon the total water soluble salts which are to be present in the extraction liquor, the proportion of ammonium hydroxide increasing with the concentration of soluble salts. When the total soluble salts content of the extraction liquor is to be less than about 9.5 per cent, the proportion of ammonia required may be calculated directly from the zinc chloride and ammonium chloride contents of the sal skimmings, but when the total soluble salts content is greater than about 9.5 per cent, the amount of ammonia required is proportionately increased.

When a liquor having a total soluble salts content less than about 9.5 per cent and a ratio $ZnCl_2:3NH_4Cl$ is desired, I have found that the amount of ammonia to use may be calculated from the expression $X = .268Z - .228A$, where $X$ is the parts by weight of ammonium hydroxide ($NH_4OH$) to add per one hundred parts of sal skimmings and $Z$ is the parts by weight of soluble zinc chloride ($ZnCl_2$) and $A$ is the parts by weight of ammonium chloride originally present in one hundred parts by weight of sal skimmings. This expression, of course, only applies when a liquor having a 1:3 molecular ratio is wanted. If a liquor of 1:2 ratio and a total soluble salts content less than about 9.5 per cent is desired, I have found that the amount of ammonia to use can be calculated from the expression $X = .229Z - .291A$ where $X$, $Z$, and $A$ have the same meanings as in the expression set forth above.

In a process of my invention it is not necessary that the extraction liquor contain zinc chloride and ammonium chloride in the exact ratio of the product which it is desired to crystallize from such liquor since the ratio of these constituents in the crystal will not always coincide with their ratio in the liquor from which the crystal is produced. For instance, upon crystallization at 0° C. a liquor containing salts in the ratio $ZnCl_2 \cdot 2NH_4Cl$ will at first give a crystal of empirical composition $ZnCl_2 \cdot 3NH_4Cl$. This will diminish the ammonium chloride content of the liquor more rapidly than the zinc chloride content, and when the ratio of dissolved salts in the liquor has become $ZnCl_2 : 1.5NH_4Cl$ a crystal having the molecular ratio $ZnCl_2 : 2NH_4Cl$ will be obtained. Thus, if the number of mols of ammonium chloride in an extraction liquor is not less than 1.5 times the number of mols of zinc chloride, at least some crystals of the double salt, $ZnCl_2 \cdot 3NH_4Cl$ can be produced.

Since as pointed out above a product of 1:3 ratio is particularly desirable as a galvanizing flux, I prefer to employ in my novel processes such proportions of reactants as will give an extraction liquor containing at least 1.5 mols of ammonium chloride per mol of zinc chloride. To make a liquor having this ratio according to a process of my invention, provided the total salts content of the extraction liquor is less than about 9.5 per cent, one would use an amount of ammonia calculated from the expression $$X = .199Z - .339A$$

where Z is the parts by weight of soluble zinc chloride ($ZnCl_2$) and A is the parts by weight of ammonium chloride originally present in 100 parts by weight of the sal skimmings, and X is the parts by weight of ammonium hydroxide ($NH_4OH$) to add per 100 parts by weight of the sal skimmings.

In the practical application of my novel processes it is economically advantageous to operate in a cyclic manner. Thus the mother liquor from one crystallization is combined with the extraction liquor from a subsequent batch, and further crystallization is effected. An alternative procedure is to crystallize the product continuously under suitable conditions. When this is done it is important that the ratio of ammonium chloride to zinc chloride in the extraction liquor be the same as in the product crystallized out, since otherwise ammonium chloride or zinc chloride will accumulate in the crystallization liquor and a product of varying composition will be obtained.

Whether a batch or cyclic operation is contemplated, I will ordinarily prefer to use such proportions of dilute ammonium hydroxide as will give a liquor having a 1:3 ratio.

It has already been shown in the foregoing discussion that the dilute ammonium hydroxide used for extracting sal skimmings according to a process of my invention should be present in such a proportion that basic zinc chloride is precipitated in the extraction process. It has also been pointed out that the proportion of ammonium hydroxide required is dependent upon the total soluble salts content of the extraction liquor and that when this soluble salts content exceeds about 9.5 per cent the proportion of ammonium hydroxide required is disproportionately increased. I have found that if about 1.5 to 2.5 per cent excess ammonium hydroxide is added for each per cent by which the total soluble salt in the extraction liquor exceeds about 9.5 per cent, a liquor can be obtained in which the ratio of ammonium ion to zinc ion is the same as obtained at concentrations of salts less than 9.5 per cent when no excess ammonium hydroxide is used. The amount of excess ammonium hydroxide needed is nearer the top of the stated range—namely, about 2.5 per cent, when the extraction temperature is high, and nearer the lower figure of 1.5 per cent when the extraction temperature is low—that is, below about 80° F.

The application of a process embodying the above-described aspect of my invention is illustrated in Example 2.

*Example 2*

An extraction solution was made by mixing 26.55 parts by weight of ammonia solution containing 28.8 per cent $NH_3$ with 408 parts by weight of a liquor containing 32 parts of zinc ammonium chloride having approximately the empirical formula $ZnCl_2 \cdot 3NH_4Cl$. This liquor before the addition of the ammonia was representative of the wash liquor obtained by washing a filter press cake produced according to the processes of this example, as will be described below.

To this basic extraction solution there was added 200 parts by weight of sal skimmings, the analysis of which was the same as in Example 1. The mixture was agitated mechanically for thirty minutes at 120° F. The insoluble material was then filtered off and washed, the wash liquor being kept separate from the filtrate.

There was obtained 321 parts by weight of filtrate which upon analysis was found to have a total salt content of 25.5 per cent. Of this amount 48.0 per cent was total zinc calculated to zinc chloride ($ZnCl_2$). The total ammonia content calculated as $NH_4Cl$ was 52.0 per cent. The molecular proportion of $ZnCl_2$ to total ammonia present corresponded approximately to $ZnCl_2 \cdot 2.8NH_4Cl$.

It was noted that this extraction liquor was alkaline to methyl orange indicator. Accordingly, before attempting to concentrate and crystallize this solution it was neutralized with muriatic acid to about the methyl orange endpoint. The liquor was then concentrated, crystallized, and a product was obtained which had the empirical formula $ZnCl_2 \cdot 3NH_4Cl$.

The ammonium chloride content of the washed filter cake obtained as above described was determined to be .47 per cent on the basis of the dried cake. After removal of the metallic zinc from this press cake, the remainder of the insoluble material was converted to a commercially acceptable grade of zinc chloride by dissolving in muriatic acid.

The proportion of ammonium hydroxide used in Example 2 was about 28 per cent in excess of the proportion used in Example 1, and the extraction liquor had a total salts content approximately 16 per cent in excess of that of Example 1. Hence it will be seen that the amount of excess ammonium hydroxide used was about 1.8 per cent for each per cent by which the soluble salts content of the extraction liquor exceeded about 9.5 per cent.

It should be noted that when calculating the proportion of ammonia to use from the total salts content of the extraction liquor expected, any unneutralized ammonium hydroxide in the extraction liquor should be calculated as ammonium chloride, even though such ammonium hydroxide is afterwards neutralized with hydrochloric acid.

It should further be observed that wherever in this description of my invention reference is made to amount of ammonium hydroxide, this expression means ammonium hydroxide as 100 per cent $NH_4OH$ even though the ammonium hydroxide is actually present in dilute solution. In calculating the amount of aqueous ammonium hydroxide solution to use account must be taken of the water added with the ammonium hydroxide and its effect upon the concentration of total salts in the extraction liquor.

Although with higher concentrations of soluble salts in the extraction liquors obtained by a process of my invention it is necessary to use considerable amounts of excess ammonium hydroxide, it should be remembered that these excess amounts are based on the amounts used for extraction liquor containing less than about 9.5 per cent of soluble salts, and in any event the amount of ammonium hydroxide used is not sufficient to be considered otherwise than as a dilute solution.

As a practical matter, when extracting galvanizer's sal skimmings with ammonium hydroxide in accordance with a process of my invention, it is preferable to use sufficient water in the extraction so that the per cent total salts in the extraction liquor will be in the range of from about 10 to about 30 per cent. More preferably this concentration should be not greatly in excess of about 20 per cent in order to facilitate washing of the filter cake and other such manipulations.

While I have shown particular applications of the processes of my invention for illustrative purposes, it will be understood that without departing from the spirit of my invention, one skilled in the art may employ numerous specific modifications for recovering values from galvanizer's sal skimmings by extraction with dilute ammonium hydroxide.

I claim:

1. In a process for recovering values from galvanizers' sal skimmings containing insoluble material and zinc and ammonium chlorides in the ratio of less than 3 moles of ammonium chloride per mole of zinc chloride, the steps comprising treating the skimmings with a dilute ammonium hydroxide solution, the amount and concentration of ammonium hydroxide in the treating solution being sufficient to precipitate at least a portion of the zinc chloride as basic zinc chloride but insufficient to form ammoniated zinc chloride from the zinc chloride, and separating the insoluble material and precipitated basic zinc chloride from the treating solution.

2. In a process for recovering values from galvanizers' sal skimmings containing insoluble material and zinc and ammonium chlorides in the ratio of less than 3 moles of ammonium chloride per mole of zinc chloride, the steps comprising treating the skimmings with a dilute ammonium hydroxide solution, the amount and concentration of ammonium hydroxide in the treating solution being sufficient to precipitate at least a portion of the zinc chloride as basic zinc chloride but insufficient to form ammoniated zinc chloride from the zinc chloride, separating the insoluble material and precipitated basic zinc chloride from the treating solution, and crystallizing from the solution a zinc chloride-ammonium chloride double salt containing at least 2 moles of ammonium chloride per mole of zinc chloride.

3. In a process for recovering values from galvanizers' sal skimmings containing insoluble material and zinc and ammonium chlorides in the ratio of less than 3 moles of ammonium chloride per mole of zinc chloride, the step comprising treating the skimmings with a dilute ammonium hydroxide solution, the parts by weight of ammonium hydroxide used per hundred parts of sal skimmings being not substantially less than the amount calculated from the expression $(.199Z-.339A)$ nor substantially more than the amount calculated from the expression $(.268Z-.228A)$, where $Z$ is the parts by weight of soluble zinc chloride and $A$ is the parts by weight of ammonium chloride originally present in the sal skimmings.

RAYMOND J. KEPFER.